United States Patent

[11] 3,563,383

[72] Inventors Ake Hellquist
Svedudden, Djurhamn;
Sigvard Nordgard, 41 Becksjudarvagen,
Nacka, Sweden
[21] Appl. No. 813,195
[22] Filed Apr. 3, 1969
[45] Patented Feb. 16, 1971
[32] Priority Oct. 23, 1968, Apr. 24, 1968
[33] Sweden
[31] 14339/68 and 5495/68

[54] PURIFICATION SYSTEM FOR ORGANICALLY CONTAMINATED WATER
5 Claims, 9 Drawing Figs.
[52] U.S. Cl. ................................................ 210/124,
210/151, 210/242, 210/319, 210/320
[51] Int. Cl. ..................................................... B01d 21/24
[50] Field of Search ........................................ 210/101,
124, 137, 150, 151, 294, 319, 242

[56] References Cited
UNITED STATES PATENTS

| | | | |
|---|---|---|---|
| 687,423 | 11/1901 | Witt et al. | 210/124 |
| 2,022,329 | 11/1935 | Tsuna | 210/151 |
| 2,433,884 | 1/1948 | Bevan | 210/151X |
| 2,586,692 | 2/1952 | Morel | 210/150X |
| 3,109,875 | 11/1963 | Schramm et al. | 210/150X |
| 3,335,081 | 8/1967 | Naggar | 210/150X |
| 3,389,798 | 6/1968 | Hartmann et al. | 210/150 |
| 3,447,683 | 6/1969 | Luce, Jr. | 210/83 |

FOREIGN PATENTS

| | | | |
|---|---|---|---|
| 1,230,940 | 9/1960 | France | 210/150 |

*Primary Examiner*—John Adee
*Attorney*—Sughrue, Rothwell, Mion, Zinn and MacPeak

ABSTRACT: A purification system for organically contaminated water. The system comprises supporting areas that are active with respect to microorganisms and that are alternately immersed and withdrawn from the contaminated water while simultaneously being conveyed from an inlet to an outlet in a chamber containing said water.

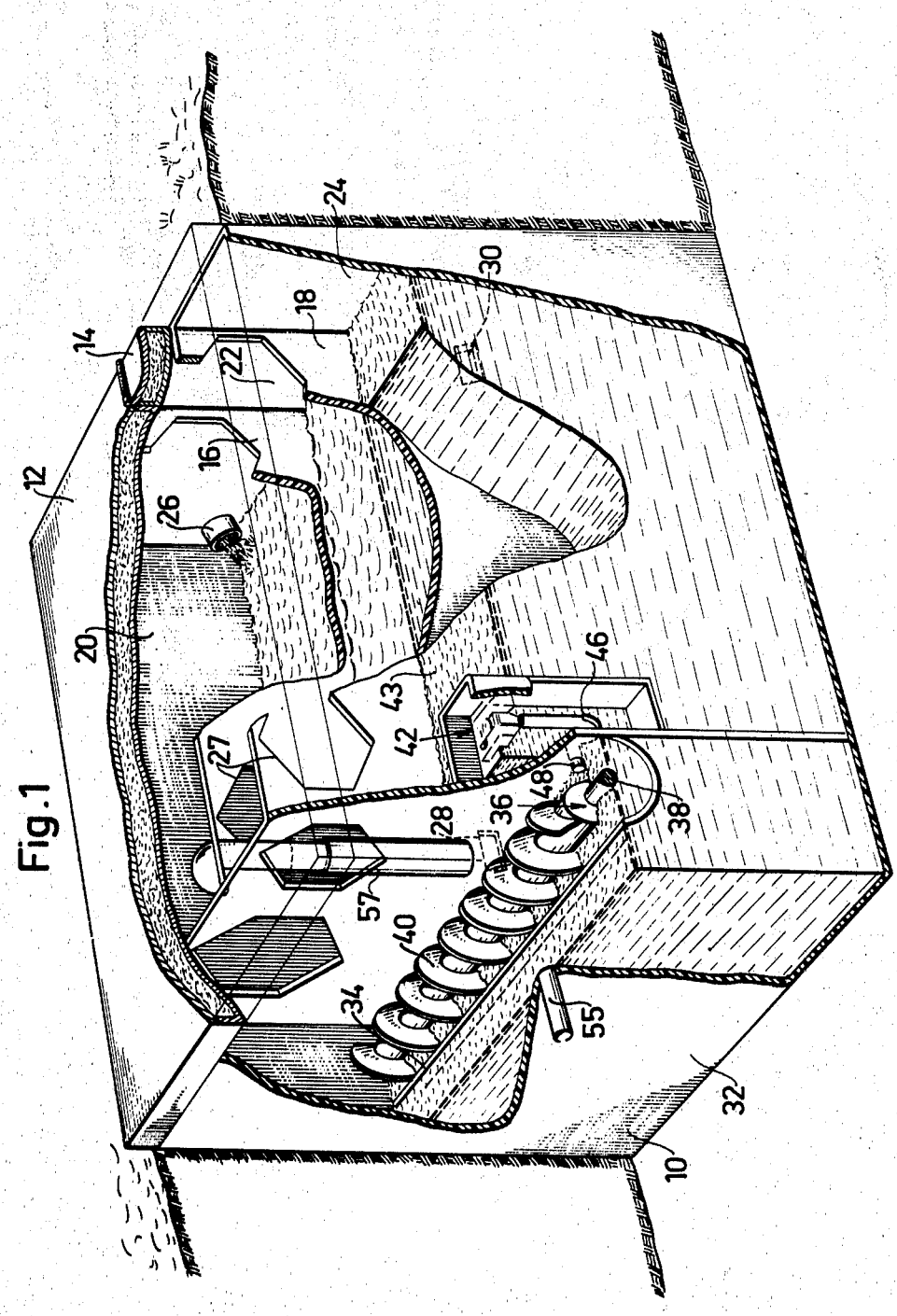

Patented Feb. 16, 1971
3,563,383
4 Sheets-Sheet 3
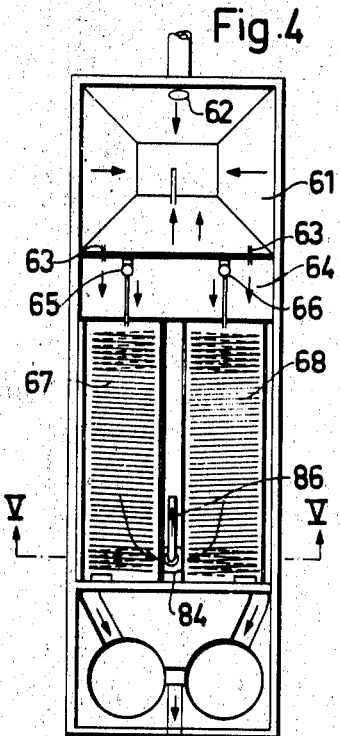
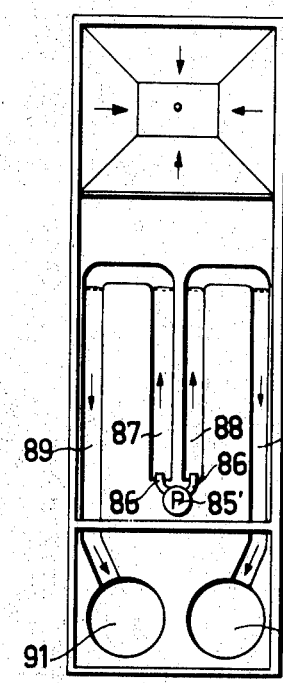
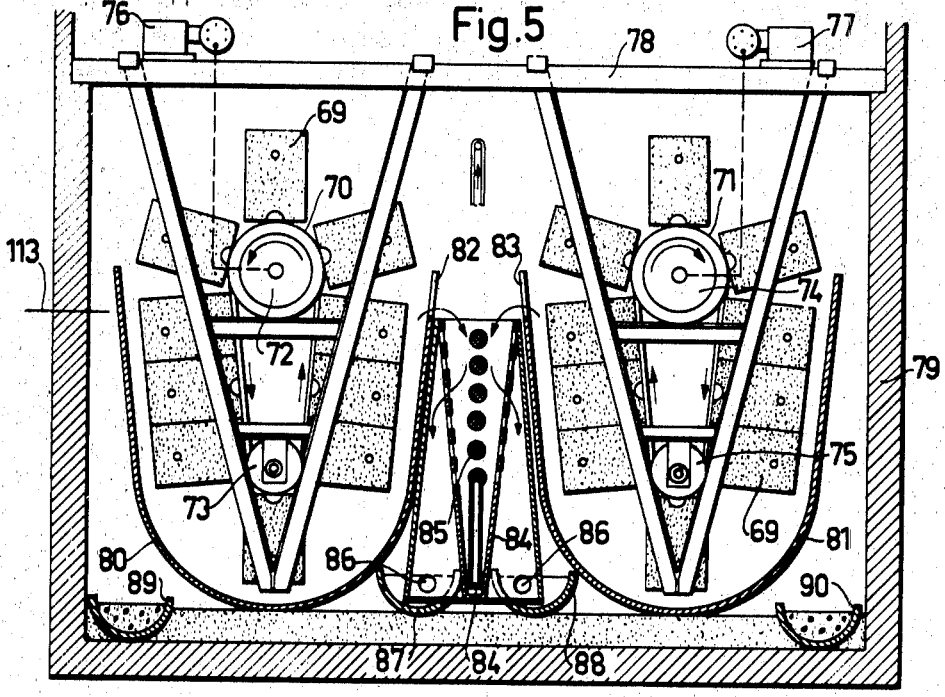

Patented Feb. 16, 1971
3,563,383
4 Sheets-Sheet 4
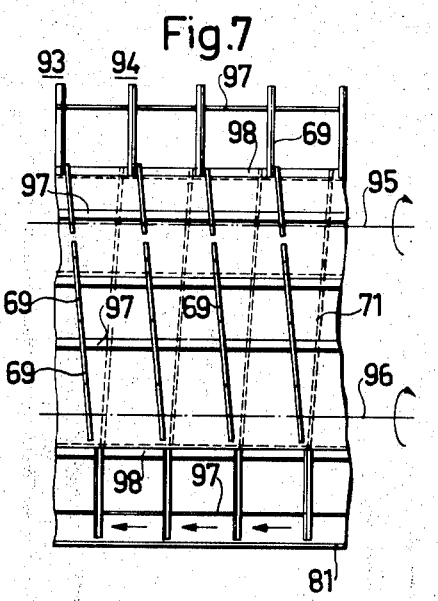
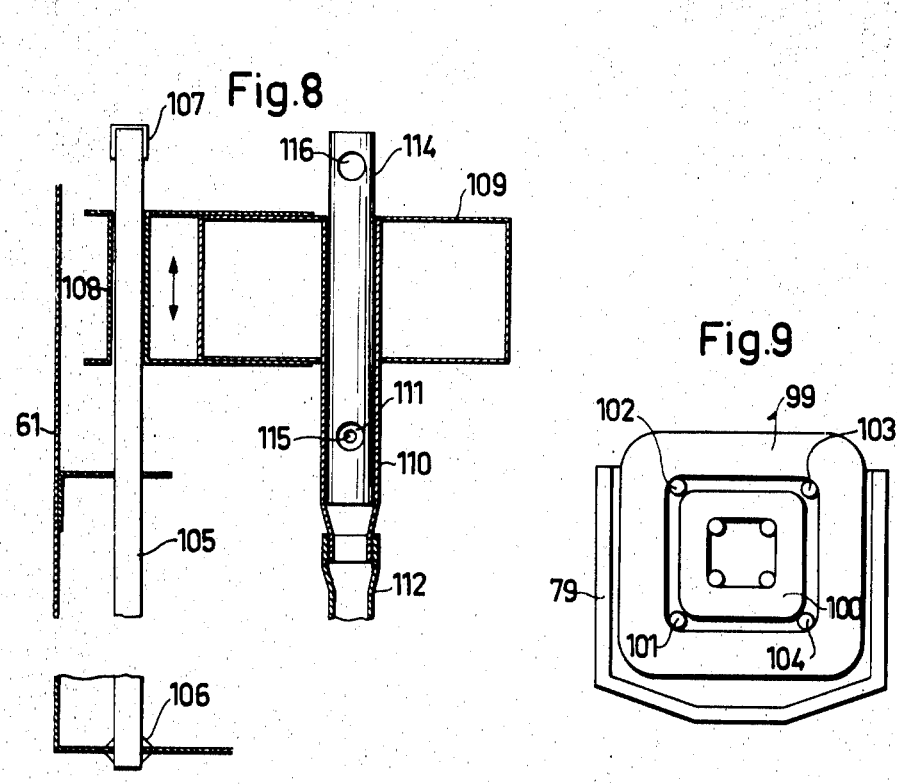

3,563,383

PURIFICATION SYSTEM FOR ORGANICALLY CONTAMINATED WATER

BACKGROUND OF THE INVENTION

1. Field of the Invention

This invention refers to a purification system for organically contaminated water, such as for instance waste water, of the type in which supporting areas that are active with respect to microorganisms are adapted to be displaced down into and up out of the contaminated water that is to be purified biologically. On the active areas, which are positioned on disc elements or similar of plastic, sheet metal or other appropriate material, there is formed a continuous layer of microbes which consume the biological impurities in the water. As the result of the areas, which are slowly driven around, being located above the water surface during a definite portion of the circulation cycle, the active microorganisms are supplied with the necessary oxygen at the same time as they recover from the effect of any microbe toxins that may be present in the water. This insensitivity to toxins makes the method particularly well adapted for purifying industrial waste water. The biochemical decomposition process is aerobic in its nature and therefore it does not cause any inconveniencing odor. When the biological layer on the active areas has reached a predetermined thickness it is discharged from its base and falls to the bottom of the container or basin in which the waste water is located.

2. Description of the Prior Art

In a known system of this type a number of flat circular discs are positioned on a rotating shaft. The planes of said discs are parallel to each other, and the water is supplied parallel to the plane of the discs, with the result that the capacity of the system with an acceptable disc diameter will be so small that it cannot be utilized economically for purifying waste water from larger establishments, such as for instance industrial plants or larger housing areas. A problem with purifying systems of this type is the difficulty of making each individual particle of grime pass through the spaces between the discs by mixing the water, which depends on the fact that the waste water to a great extent is prevented from freely passing between the active areas, and this results in that the amount of water flowing through must be maintained at a low level for enabling effective purification.

SUMMARY OF THE INVENTION

In accordance with this invention it has proved to be possible to provide a substantial increase of the capacity of a system of this type by making the water flow in a direction substantially at right angles to the planes of the active areas from one end of a rotor or the like, on which the active areas are positioned, and towards the other end of this rotor.

Furthermore, in accordance with the invention means are provided for causing the water and thereby the particles of grime to make additionally improved continuous contact with a large active area by designing this area either as one or more screw threads on a rotating roller or in the form of laminate discs lying along helixes on a belt running over rollers. The helical motion forces the waste water to pass the entire length of the rotating roller and the belt, respectively, and thereby each individual particle of grime will with certainty be made to contact the active area. As the result of the rotative and helical motion the dead microbe mass will furthermore be maintained suspended in the water and it will be screwed along through the container to the rear portion thereof. A system having one or more helical areas positioned on a roller has proved to be exceedingly effective and well suited for small purifying systems, whereas systems having flat elements positioned on belts are particularly appropriate for industrial plants and communities having a great amount of waste water.

Thus the object of the invention is to provide a purification system having a capacity many times greater than known systems in comparison to its dimensions. This object is realized by making the water flow at substantially right angles to the areas, with the substantial improvement achieved thereby amplified by the positive conveying of the waste water when the active areas are positioned along one or more helixes.

Another object of the invention is to provide a purification system which while maintaining complete purification may process waste water that is supplied to the system very irregularly, which latter always is the case when a system is to serve for instance an industrial plant or a hospital.

BRIEF DESCRIPTION OF THE DRAWING

Various embodiments of the invention are described and are disclosed in the accompanying drawings, in which FIG. 1 is a perspective view of a first embodiment having certain portions cut away for clarification, FIG. 4 shows a simplified view of another purification system in accordance with the invention, FIG. 5 shows a cross section along the line V-V of FIG. 4 on an enlarged scale, FIG. 6 shows a view of the same type as FIG. 4 but with the disc assemblies removed, FIG. 7 shows a portion of the right disc assembly of FIG. 5 on an enlarged scale, as viewed from the right, FIG. 8 shows a device in accordance with the invention for equalizing the flow of water, and FIG. 9 shows a highly simplified view of two purifying assemblies in accordance with the invention positioned in each other.

DESCRIPTION OF THE PREFERRED EMBODIMENTS

Figure 3:
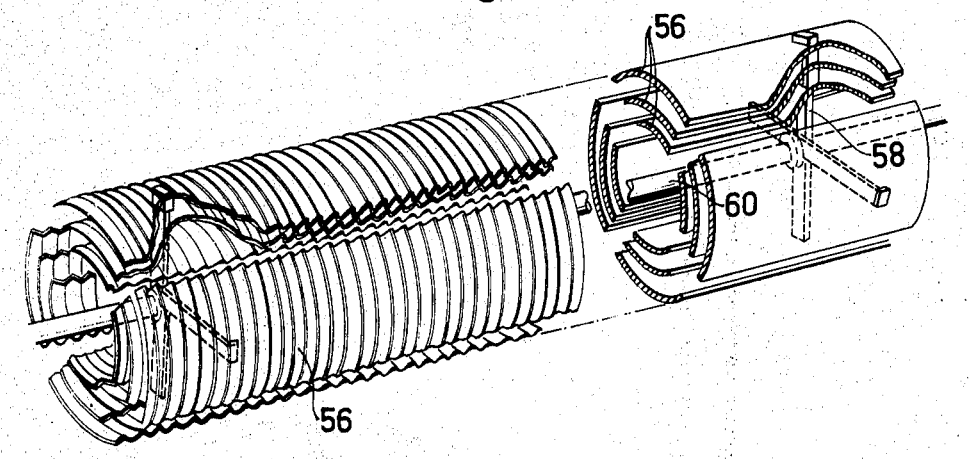
FIG. 3 shows a perspective view of a modified rotor.

In FIG. 1 the designation 10 refers to a container that may be buried in the ground and that is provided with a suitable heat insulated cover 12 having one or more hatches 14, through which the interior of the container is accessible for inspection, removing sludge etc. In the illustrated embodiment the container is divided into three settling basins 20, 22 and 24, respectively, by means of partitions 16, 18, with the waste water supplied from a drain 26 successively passing through said basins. Said partitions are provided with apertures 28, 30 located below the normal surface of the liquid. The air spaces of the basins are also in open communication by means of apertures 27. In the various basins sludge from solid components accompanying the waste water successively settles in manner known per se.

A fourth so-called clarifying basin 32 contains a horizontally positioned trough 34 of approximately semicylindrical form, in which there is positioned a rotor 36 having its shaft 38 in communication with a drive motor that is not shown, such as an electric motor. The axis of shaft 38 coincides with the axis of trough 34. Furthermore, the shaft carries a vane-shaped helical screw thread 40 which is adapted to rotate with small play with respect to the partially cylindrical wall of the trough 34 and which alternately moves through the water located in the trough and the atmosphere above the trough in chamber 32. The rotor 36 may be entirely or partly made of plastic material and has low weight.

Figure 2:
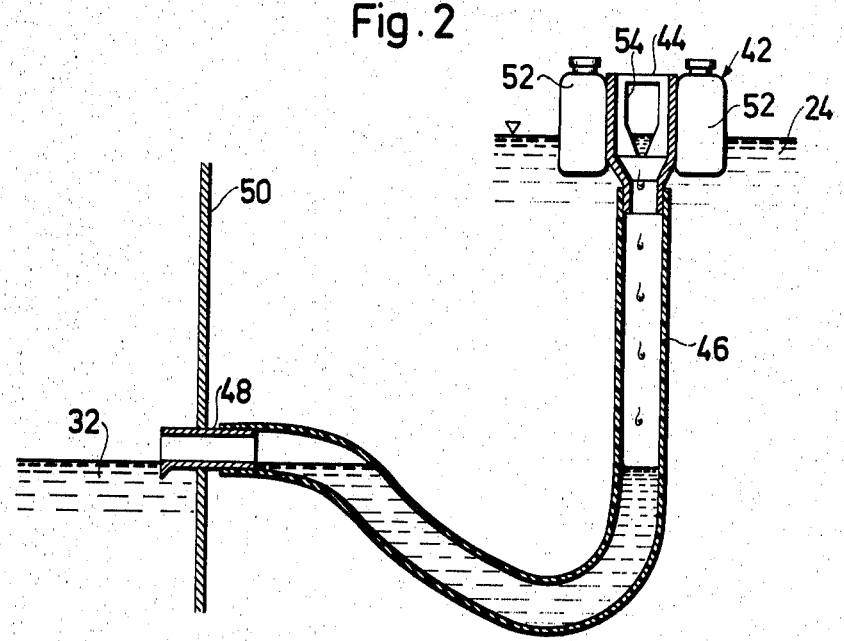
FIG. 2 shows a portioning device associated with the system on an enlarged scale.

In the settling basin 24 through which the waste water passes last there is positioned a portioning device with the general designation 42, with said device being surrounded by a shield 43 that keeps sludge away. As specifically may be seen from FIG. 2 this portioning device consists of a container 44 communicating with a piece of flexible tubing 46 at its lower open end. At its bottom the tubing 46 is connected to a short pipe 48 that passes through a partition 50 separating the clarifying basin 32 from the remainder of the basins. The container 44 floats on the water for example with the assistance of a pair of floats 52 which to a greater or lesser extent may contain a liquid, for instance oil, for controlling their displacement and thus the height of the container relative to the water level of the basin 24. By means of a slot 54 having its width decreasing downwards in the form of a wedge the interior of the container 44 communicates with the surrounding water so that a limited flow of water occurs in the container and through the tubing 46 to the clarifying basin 32. As may be understood from the above, the amount of water per unit of time may be controlled by adjusting the floating height of the container 44 relative to the water level of the basin 24.

When the system functions, the rotor 36 is made to rotate slowly. Water is supplied in a small constant quantity through the device 42 and will then flow axially through the trough 34, the upper edge of which thus lies slightly higher than the level of the water outside of the trough in the clarifying basin 32. Accompanying organic substances are removed from the water by the microbe culture developed on the thread 40 of the rotor with the water being slowly conveyed axially along the trough from one side thereof to the other. It will thus be seen that one and the same quantity of water will make contact with areas of the threading several times along its path in the longitudinal direction of the trough so that the microbes will have sufficient time to implement the absorption or the decomposition of the organic substances. Simultaneously the threading will see to it that the water is conveyed at the desired rate in the longitudinal direction of the trough. The water is purified mechanically and biologically to a high degree and is discharged through an outlet 55. A change of air in the air space above the clarifying basin 32 is effected through a conduit 57.

The quantity of waste water supplied to the purification system varies greatly during the 24 hours of the day and is thus normally the greatest during the morning hours. However, the biological purifying device in the basin 32 can only treat a lesser quantity of water per time unit and said water must therefore be supplied to the trough 34 to a considerably restricted extent. The portioning is ensured by means of the device 42, as the quantity of water flowing through the restricting slot 54 is constant, irrespective of the fluctuating levels of the liquid in the settling basins, which thus are higher than the constant level in the trough 34.

The length of the flexible tubing 64 may appropriately be selected such, that if too great a quantity of waste water should be supplied to the system and therefore the level in the settling basins increases to an unnormally high degree, the tubing will not permit the container 44 to follow along upwards without limitation. When the tubing has been stretched the container 44 will therefore be drawn down into the water so that a stronger flow from the settling basins will be provided. This will restore the equilibrium, although a quantity of water will not instantaneously be completely purified biologically in the clarifying basin 32.

The embodiment of FIG. 3 differs from the previous one in that the rotor is composed of a plurality of concentric segments 56, which are supported by the driven shaft 60 by cross means 58 or similar. The segments 56 may be corrugated, and the corrugations may be helical.

FIG. 4 illustrates a presettling well 61 to which the contaminated waste water is supplied through a conduit 62. The presettling well 61 has the object of receiving larger particles in the waste water which sink to the bottom of the well. The waste water is conveyed from the presettling well 61 through schematically indicated small openings 63 to a tank 64 and from there to the purifying assemblies 67, 68 in dependence of control means 65, 66, which will be described in detail below. In the illustrated embodiment these purifying assemblies 67, 68 consist of discs which in appropriate manner, for instance by gluing or riveting, are fastened to flexible belts 70, 71 of plastic, rubber, stainless steel or similar. The belts 70, 71, of which one is contemplated for each assembly 67, 68 but which belts also may be divided into subbelts separated from each other, run over rollers or cylinders 72, 73 and 74, 75, respectively, with the upper rollers 72, 74 being driven by means of electric motors 76, 77. Each belt 70, 71 supports rows of purifying discs 69 positioned behind each other and fabricated of for instance plastic or metal plate. The distance between the rows may appropriately be selected between approximately ½ and 3 centimeters, depending on the character of the impurities. The discs may to advantage be provided with coarse surfaces that for instance may have been formed by means of adhesive sand layers for facilitating the buildup of a microbe layer.

Each purifying assembly 67, 68 is positioned on a base 78 and is immersed in a chamber 79 in the illustrated embodiment. Furthermore, the purifying assemblies are surrounded by U-shaped containers 80, 81 in the illustrated embodiment. The upper inside walls of the containers 80, 81 are provided with openings 82, 83 in their ends remote from the settling well 71, with the biologically purified water and dead microorganism lumps being supplied through said openings to a conical sieve 84 which is provided with openings 85 that substantially only pass the purified water. For this purpose the openings 85 may for example be provided with a fine-mesh screen, as is indicated in FIG. 5. Sludge collected in the bottom of sieve 84 may for instance be removed by means of a sludge pump 85', that may pump the sludge to the presettling chamber 61 through a conduit 86 (FIG. 4) if desired.

The water fed out from the sieve 84 through the openings 85 flows through openings 86 to troughs 87, 88, from which the water flows to troughs 89, 90 and may be pumped from the latter through specific filters 91, 92 for removing nutritive salts, toxins or similar if necessary. The troughs 87—90 may be filled with sand, activated carbon or similar for providing extra purification.

The essential thing in each of the two purifying assemblies described so far is that the discs in each row are positioned in a helical path, as best may be seen from FIG. 7. The pitch of the path may vary between around 1° and a few arc minutes. As may be seen from FIG. 7 the discs of each row, for instance rows 93 and 94, respectively, are positioned obliquely with respect to the axes of rotation of the respective supporting rollers 72, 73 and 74, 75. The axes of rotation of the rollers 74, 75 are designated 95 and 96, respectively, in FIG. 7. When the rollers are driven as indicated by the arrows on rollers 72 and 74 in FIG. 5 and the discs are positioned obliquely in the respective assemblies as indicated in FIG. 4, a screwing action will occur. By this screwing action the contaminated water from the settling chamber 61 will be "screwed" forward in the spaces between the discs in each row and furthermore the discs will permit a certain flow of water in the axial direction of the rollers 72, 73, 74 and 75, respectively. By means of this combined effect of a screwing motion provided as the result of the setting of the discs and an axial flow that is dependent of the natural water flow it is ensured that each individual particle of grime will make contact with the biologically active disc areas to the greatest possible extent, at the same time as the system of discs and belts permits a buildup of the greatest possible active area within the smallest possible space.

As may be seen from FIG. 7 the discs 69 are held together in rows by spacing rods 97 and are fastened to flanges 98 on the belts.

This in turn results in the purifying capacity becoming substantial even in very small assemblies for purifying waste water from for instance an industrial plant. In order to maintain the volume as small as possible in assemblies having very great capacities it is possible to build an internal assembly 100 inside an outer disc-belt assembly 99 (FIG. 9), which for example corresponds to the assembly 67 of FIG. 4. In FIG. 9 the individual discs 69 are not shown, and furthermore the belts supporting the discs are considered to run over four rollers in this case, for instance the rollers 101, 102, 103 and 104, respectively.

The water control means 65 previously indicated, of which there is one for each purifying assembly 67, 68 of FIG. 4, have the purpose of controlling the water supply to each assembly in such manner that the water provided to the respective assembly per time unit will not exceed the maximum purifying capacity of the assembly.

The purification system with two purifying assemblies 67, 68 as described is intended to operate with water quantities varying heavily during the 24 hours of the day, wherein it also has been assumed that the quantity of water supplied in the daytime is more contaminated than the water supplied at night. Therefore the assembly 67 may appropriately receive the most heavily contaminated water, with the distance between the disc rows of said assembly being greater than the distance between the disc rows in the other purifying assembly 68 so as to prevent obstruction. The pitch of the helix formed by the discs in the first assembly may appropriately be made the greatest at the inlet and, whereas it decreases towards the outlet end.

FIG. 8 illustrates the construction of one of the water control means, for instance means 65. A guide rail 105 having a lower shoulder 106 and an upper shoulder 107, which latter appropriately may be adjustable along the guide rail 105, is affixed to the wall of the settling chamber 61 or to some other stationary object. A guide sleeve 108 which is joined to a float 109 provided with a central stem 110 slides on the guide rail 105. At its lower end the stem 110 is provided with an inlet aperture 111. The lower end of the stem 110 is connected to a piece of flexible tubing 112. As has been mentioned above, water from the settling chamber is conveyed through the openings 63 to the tank 64, in which the water control means floats, and through said means via the tubing 112 to the container of the associated purifying assembly, for instance container 80. A maximum water level is to be maintained in the purification system, and this level has been indicated by the line 113 in FIG. 5. The water must not rise over this level, as the discs will not receive enough air if this is the case.

In order to provide the intended drainage from the tank 64 to the respective purifying assembly a replaceable adjusting pipe 114 having a quantity setting aperture 115 positioned in the free opening of the aperture 111 is positioned in the stem 110. Furthermore, the pipe 114 is provided with an upper flooding opening 116 and is open at the top. The aperture 115 has a size corresponding to the desired quantity of water per time unit (for instance 265 gallons per minute). When the float 109 floats on the water surface in the tank 64 a constant quantity of water per time unit will therefore flow in through the apertures 111, 115 and through the stem 110 and the tubing 112 to the associated purifying assembly. If the water conveyed to the settling chamber suddenly exceeds the normal quantity, the supply to the tank 64 will not be in proportion to the drainage therefrom, so that float 109 will rise towards the stop means 107 and will be arrested there. If the water continues to rise, the water surface will eventually reach the flooding opening 116 by the float being urged under the water surface. The flooding opening 116 is considerably larger than the aperture 115, and although the purifying assembly thereby will receive too great a water volume, flooding will be avoided. If the water rises additionally the upper open end of the pipe 114 will eventually be reached. Naturally a purifying assembly may also be dimensioned such, that it is not utilized to its full extent with a normal supply of water and that this does not happen until flooding occurs, whereby complete biological purification always will be achieved.

In the illustrated embodiment with two purifying assemblies 67, 68 the control means 65 is set for flooding, i.e. in such manner that water will flow through the flooding opening 116 in addition to through the quantity setting aperture 115 when unnormally large quantities of water flow to the settling well 61, whereas control means 66 is set so as not to be flooded until the water level of the well 61 becomes so high that there is a danger of overflow.

The illustrated system may naturally be modified in various ways, and thus it may comprise any number of purifying assemblies, all being independent of each other. If a plurality of assemblies are utilized they may be connected in series with each other instead of being connected in parallel as in the described embodiment. Of course it is possible to eliminate the settling well if the water is not so contaminated that presettling is necessary, and furthermore the control means for the water supply may be disposed in different ways.

We claim:

1. A system for biological purification of waste water having at least one purifying assembly comprising a chamber, an inlet communicating with said chamber for introducing waste water to said chamber, an outlet communicating with said chamber for removing purified water from said chamber, a flexible endless belt disposed with said chamber, plural rollers forming a continuous path over which said endless belt is stretched, a plurality of rows of disc elements disposed adjacent to each other and positioned along the outer surface of said belt for supporting active microorganisms, said disc elements in each of said rows being disposed in a helical path along the outer surface of said endless belt, and means for driving said endless belt in such a direction that water fed into said chamber at the inlet is driven by the screwing action of said discs towards the outlet while the discs are sequentially displaced into and withdrawn from said water.

2. A purification system in accordance with claim 1, wherein the helix of said disc elements has a pitch decreasing from the first disc row at the inlet towards the last disc row at the outlet of the chamber.

3. A purification system in accordance with claim 2, wherein there exist at least two purifying assemblies and further comprising individual control means for supplying water independently to each purifying assembly whereby one control means supplies one purifying assembly with a constant quantity of water per time unit irrespective of the quantity of waste water fed into the purification system whereas the other control means increases the supply of water to the other purifying assembly when the waste water fed in exceeds a predetermined quantity.

4. A purification system in accordance with claim 3, wherein the other purifying assembly is dimensioned to purify a greater quantity of water per unit time than said first assembly.

5. A purification system in accordance with claim 3 wherein each control means comprises a float adapted to float on the surface of the water to be supplied to a purifying assembly and a stationary vertical guide means for guiding said float, a vertical stem depending from said float, a flexible tube connected at one end to said vertical stem and at the other end to said purifying assembly, said stem being provided with an inlet opening between the bottom of said float and said tube and a replaceable quantity adjusting pipe that is sealingly introduced into said stem, having a settling aperture at its lower end in register with said inlet opening for adjusting the quantity per unit time of water which may be introduced through said inlet opening.